United States Patent
Miller et al.

(10) Patent No.: US 8,340,016 B1
(45) Date of Patent: Dec. 25, 2012

(54) FLEXIBLE FORWARD AND RETURN CAPACITY ALLOCATION IN A HUB-SPOKE SATELLITE COMMUNICATION SYSTEM

(75) Inventors: Mark J. Miller, San Marcos, CA (US); Kenneth V. Buer, Gilbert, AZ (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/560,825

(22) Filed: Jul. 27, 2012

Related U.S. Application Data

(60) Provisional application No. 61/513,317, filed on Jul. 29, 2011, provisional application No. 61/568,569, filed on Dec. 8, 2011, provisional application No. 61/568,578, filed on Dec. 8, 2011, provisional application No. 61/591,810, filed on Jan. 27, 2012.

(51) Int. Cl.
*H04J 3/08* (2006.01)

(52) U.S. Cl. ........................................ 370/326

(58) Field of Classification Search .............. 370/310, 370/315, 326–328, 339–345; 455/3.02, 427–431
See application file for complete search history.

(56) References Cited

U.S. PATENT DOCUMENTS

| | | | |
|---|---|---|---|
| 5,991,279 A * | 11/1999 | Haugli et al. ............ 370/311 |
| 6,377,561 B1 | 4/2002 | Black |
| 6,522,643 B1 | 2/2003 | Jacomb-Hood et al. |
| 6,625,129 B1 | 9/2003 | Olds |
| 6,801,565 B1 | 10/2004 | Bottomley et al. |
| 6,898,428 B2 | 5/2005 | Thorburn et al. |
| 6,957,078 B1 | 10/2005 | Yousefi et al. |
| 6,992,992 B1 | 1/2006 | Cooper |
| 8,144,643 B2 * | 3/2012 | Miller et al. ............ 370/321 |
| 8,218,476 B2 | 7/2012 | Miller et al. |
| 2002/0159403 A1 | 10/2002 | Reddy |
| 2004/0166801 A1 | 8/2004 | Sharon et al. |
| 2005/0197060 A1 | 9/2005 | Hedinger et al. |
| 2006/0126552 A1 | 6/2006 | Lee |

(Continued)

FOREIGN PATENT DOCUMENTS

EP    1168670 A2    1/2002

(Continued)

OTHER PUBLICATIONS

Lowry et al. Advanced Communications Technology Satellite. System Handbook, NASA TM-101490, revisions Sep. 30, 1993, 126 pages.

(Continued)

*Primary Examiner* — Frank Duong
(74) *Attorney, Agent, or Firm* — Kilpatrick Townsend & Stockton LLP

(57) ABSTRACT

A method for conducting communications via a satellite includes providing a hub-spoke spot beam group. The hub-spoke spot beam group includes at least one fixed location spot beam illuminating a location containing a gateway terminal and at least one fixed location spot beam illuminating a location containing at least one user terminal. The satellite comprises a pathway associated with the hub-spoke spot beam group. At least one receive-side switch is sequentially switched to connect an input of the pathway with different spot beams within the hub-spoke spot beam group. At least one transmit-side switch is sequentially switched to connect an output of the pathway with different spot beams within the hub-spoke spot beam group. Beam switching patterns support both forward and return traffic within a frame.

30 Claims, 10 Drawing Sheets

U.S. PATENT DOCUMENTS

| | | |
|---|---|---|
| 2007/0135051 A1 | 6/2007 | Zheng et al. |
| 2008/0146145 A1 | 6/2008 | Pateros et al. |
| 2009/0023384 A1 | 1/2009 | Miller |

FOREIGN PATENT DOCUMENTS

| | | |
|---|---|---|
| EP | 1328076 A2 | 7/2003 |
| WO | 98/32245 | 7/1998 |
| WO | 2011/139991 A1 | 11/2001 |

OTHER PUBLICATIONS

Gedney et al. ACTS Technology Description and Results, National Aeronautics and Space Administration, Prepared under Contract NAS3-23790, Glen Research Center, Feb. 2000, 158 pages.

Gedney et al. Advanced Communications Technology Satellite (ACTS), NASA Lewis Research Center, 1989, 12 pages.

Berk et al. On-Board Processing for Future Satellite Communications Systems: Comparison of FDM, TDM, and Hybrid Accessing Schemes, MTR 8701 MITRE Bedford MA, Jun. 1982, 192 pages.

Signatron, Inc. 30/20 GHz FSS Feasibility Study Final Report JPL Contract No. 957641, Feb. 12, 1987, 296 pages.

Krawczyk, R. The Advanced Communications Technology Satellite—Performance, Reliability and Lessons Learned, ACTS Conference 2000 Proceedings, pp. 175-184.

Advanced Communications Technology Satellite (ACTS) Technology System Overview, retrieved on Jul. 27, 2012 at http://acts.grc.nasa.gov/technology/index.shtml, 2 pages.

Advanced Communications Technology Satellite (ACTS), Technology Spacecraft, retrieved on Jul. 27, 2012 at https://acts.grc.nasa.gov/technology/spacecraft/index.shtml, 2 pages.

Advanced Communications Technology Satellite (ACTS), Technology Spacecraft Specifications, retrieved on Jul. 27, 2012 at https://acts.grc.nasa.gov/technology/spacecraft/specs.shtml, 6 pages.

Advanced Communications Technology Satellite (ACTS), Technology Spacecraft, Multiple Hopping Beam Antennas, retrieved on Jul. 27, 2012 at https://acts.grc.nasa.gov/technology/spacecraft/multihop.shtml, 2 pages.

Advanced Communications Technology Satellite (ACTS), Technology Spacecraft, On-Board Baseband Processing (BBP) and Switching, retrieved on Jul. 27, 2012 at https://acts.grc.nasa.gov/technology/spacecraft/bbp.shtml, 2 pages.

Advanced Communications Technology Satellite (ACTS), Technology Spacecraft, Microwave Switch Matrix (MSM), retrieved on Jul. 27, 2012 at https://acts.grc.nasa.gov/technology/spacecraft/msm.shtml, 1 page.

Advanced Communications Technology Satellite (ACTS), Technology Spacecraft, Adaptive Rain Fade Compensation, retrieved on Jul. 27, 2012 at https://acts.grc.nasa.gov/technology/spacecraft/rainfade.shtml, 2 pages.

Advanced Communications Technology Satellite (ACTS), Technology Earth Stations, retrieved on Jul. 27, 2012 at https://acts.grc.nasa.gov/technology/earthstations/index.shtml, 2 pages.

Ogawa et al. Wideband InterNetworking Engineering Test and Demonstration Satellite (WINDS), National Institute of Information and Communications Technology, vol. 54 No. 4 Sections 1-7, 2007, retrieved on Jul. 27, 2012 at http://www.eoportal.org/directory/pres_WINDSWidebandInterNetworkingengineeringtestandDemonstrationSatellite.html, 120 pages.

WINDS (Wideband InterNetworking engineering test and Demonstration Satellite), retrieved on Jul. 27, 2012 at http://www.eoportal.org/directory/pres_WINDSWidebandInterNetworkingengineeringtestandDemonstrationSatellite.html, 14 pages.

Arnold et al., Mobile Communications in A Geosynchronous Regenerative Satellite Mesh (Rsm) System, pp. 1-6, Hughes Network Systems, Germantown, Maryland.

Beam Forming Networks, Application Note, pp. 1-36. EMS Technologies, Inc. Aug. 2004, Revision B.

Couchman, A. et al. Defocused Array Fed Reflector Antennas for Ka, Broad Band Satellites, pp. 1-8.

Franchi et al., Technology Trends and Maket Drivers for Broadband Mobile Via Satellite: Inmarsat Bgan, pp. 1-9, London, United Kingdom.

Gopal et al., *Regenerative Satellite Mesh System for Realtime Multi-Party Multimedia Traffic Hughes Network Systems*, LLC (Hughes) Germantown, MD.

Gopal et al., *Technology Readiness of Future Generation Networks Leveraging Regenerative Satellite Mesh Architecture—A Spaceway Perspective*, pp. 1-7, Hughes Network Systems, LLC, Germantown, MD.

Gopal, R. *Innovations in Satellite Networking Technology and Products*, pp. 1-10. Hughes, SIA, Dec. 7, 2006.

Hadinger et al., *Next Generation High Capacity Ka-Band Satellite Systems*, pp. 1-8, Northrop Grumman Space Technology, Redondo Beach, CA.

Kitao et al., *Proto-Flight Model Development of the Multi-beam Active Phased Array Antenna for WINDS*, pp. 1-4.

"KIZUNA" (WINDS) (Wideband InterNetworking engineering test and Demonstration Satellite) (Launched by H-IIA F14), WINDS Project Team, Office of Space Applications Japan Aerospace Exploration Agency, 17 pages.

Mallison et al., Enabling Technologies for the Eurostar Geomobile Satellite, p. 1-10. 19th AIAA International Communications Satellite Systems Conference. ICSSC, 2001.

Nelson, J. Top Satellite Technology at Forefront. Boeing Frontiers, 1(3). (2002). 5 pages.

Reudink, D.O. et al., A Scanning Spot-Beam Satellite System, Bell System Technical Journal, vol. 56, Oct. 1977, p. 1549-1560.

Rooney, K. J. *Evolving Satellite Markets and their Enabling Technologies*, pp. 1-18, Boeing Satellite Systems, Los Angeles, CA, Oct. 2002.

Roper et al., *WGS phased arrays support next generation DoD SATCOM capability*. IEEE International Symposium on Phased Array Systems and Technology, 2003, pp. 82-87 (2003).

Rustako, A. J. Jr. et al., An Experimental Scanning Spot Beam Satellite System Implementing 600 Mbit/Sec Tdma, IN: International Conference on Digital Satellite Communications, 6th, Phoenix, AZ, Sep. 19-23, 1983, Proceedings (A85-15451 04-32). New York, Institute of Electrical and Electronics Engineers, 1983, p. XI-18 to XI-23.

Satellite Provision of Next Generation Broadband Services in UK, Prepared for the Broadband Stakeholder Group, pp. 1-27, Oct. 29, 2007. Information Technology Telecommunications and Electronics Association, London.

Science Applications International Corporation. Satellite Communications Technology Database. NASA CR-2001-210563-PART2, Mar. 2001, 71 pages.

Stone, J. SPACEWAY 3 Takes Flight pp. 1-4. Near Earth LLC (Aug. 2007).

Sunderland et al., Megagate ASICs for the Thuraya Satellite Digital Signal Processor, pp. 1-8, Proceedings of the International Symposium on Quality Electronic Design, 2002 IEEE Computer Society (2002).

Torlak et al. Fast Estimation of Weight Vectors to Optimize Multi-Transmitter Broadcast Channel Capacity. IEEE Transactions on Single Processing, vol. 46, No. 1 Jan. 1998, 4 pages.

Whitefield et al., Spaceway Now and in the Future: On-Board IP Packet Switching Satellte Communication Network, pp. 1-7, Hughes Network Systems, LLC, Germantown, MD.

International Search Report corresponding to PCT Application No. PCT/US2010/026934, dated May 11, 2010, 12 pages.

International Search Report corresponding to PCT Application No. PCT/US2011/34845, dated Aug. 26, 2011, 13 pages.

U.S. Appl. No. 13/560,788, filed Jul. 27, 2012.

International Search Report and Written Opinion for PCT Application No. PCT/US2012/048668, mailed on Oct. 19, 2012, 10 pages.

\* cited by examiner

FIG. 4A
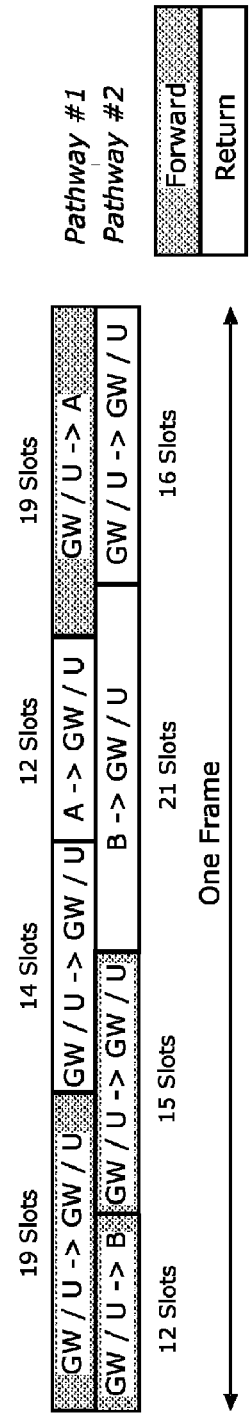
FIG. 4B – Example Frame 1
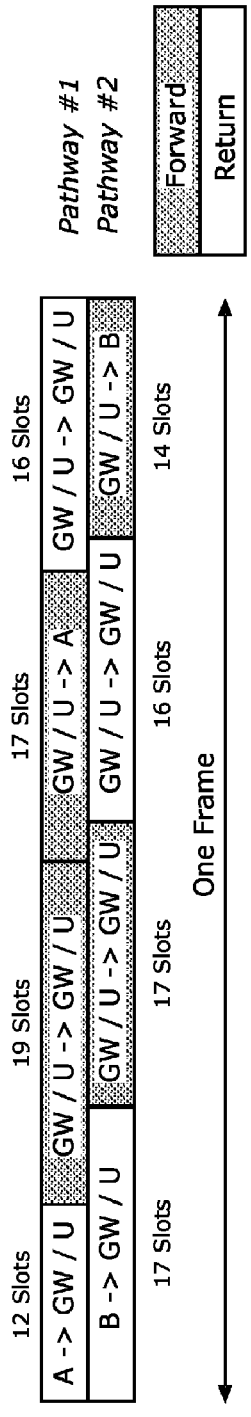
FIG. 4C – Example Frame 2

FLEXIBLE FORWARD AND RETURN CAPACITY ALLOCATION IN A HUB-SPOKE SATELLITE COMMUNICATION SYSTEM

CROSS-REFERENCES TO RELATED APPLICATIONS

The present application claims benefit of priority under 35 U.S.C. §119(e) of U.S. Provisional Application Nos. 61/513,317, filed Jul. 29, 2011; 61/568,569, filed Dec. 8, 2011; 61/568,578, filed Dec. 8, 2011; and 61/591,810, filed Jan. 27, 2012; the entire contents of which are incorporated herein by reference in their entirety for all purposes.

FIELD OF THE INVENTION

The present invention relates generally to satellite communication systems and, more particularly, to providing flexible forward and return capacity allocation in a hub-spoke satellite communication system.

BACKGROUND

Broadband internet access may be provided via satellite-based communication systems. Systems have been fielded which provide multi-Gbps capacity. The systems fielded to date have fixed designs based on pre-defined allocation of capacity as a function of geography, data flow direction, etc.

SUMMARY

Some embodiments of the present invention provide a high capacity hub-spoke spot beam satellite architecture with increased flexibility for allocating capacity both temporally and spatially as well as between both forward and return traffic.

In accordance with an embodiment of the invention, a method for conducting communications via a satellite may include providing a hub-spoke spot beam group using at least one directional antenna on the satellite. The hub-spoke spot beam group may include at least one fixed location spot beam illuminating a location containing a gateway terminal and at least one other fixed location spot beam illuminating a location containing at least one user terminal. The satellite may include a pathway associated with the hub-spoke spot beam group. At least one receive-side switch may be sequentially switched to connect an input of the pathway with different spot beams within the hub-spoke spot beam group according to a receive beam switching pattern. At least one transmit-side switch may be sequentially switched to connect an output of the pathway with different spot beams within the hub-spoke spot beam group according to a transmit beam switching pattern. The receive beam switching pattern and the transmit beam switching pattern may be synchronized over a frame to establish both forward traffic and return traffic over the pathway during the frame. The forward traffic may be sent from the gateway to the at least one user terminal, and the return traffic may be sent from the at least one user terminal to the gateway. A first fraction of time in the frame may be used to support forward traffic, and a second fraction of time in the frame may be used to support return traffic. The first and second fractions may be selected based on a desired ratio between forward and return capacity.

In an embodiment, the receive beam switching pattern and transmit beam switching pattern may be repeated in each of a plurality of consecutive frames.

In another embodiment, the location illuminated by the at least one fixed location spot beam and containing the gateway terminal may also contain at least one user terminal.

In another embodiment, the satellite may include a plurality of pathways each associated with a corresponding hub-spoke spot beam group. For each pathway and corresponding hub-spoke spot beam group, at least one receive-side switch may be sequentially switched according to a receive beam switching pattern, and at least one transmit-side switch may be sequentially switched according to a transmit beam switching pattern, to establish both forward traffic and return traffic over the pathway during the frame. A first fraction of time in the frame may be used to support forward traffic, and a second fraction of time in the frame may be used to support return traffic. The first and second fractions may be selected based on a desired ratio between forward and return capacity.

In yet another embodiment, the pathway associated with the hub-spoke spot beam group may include a receiver and a transmitter. In some embodiments, the receiver may include a low noise amplifier (LNA). In other embodiments, the transmitter may include a high-power amplifier (HPA).

In accordance with another embodiment of the invention, a satellite communication system may include a gateway, at least one user terminal, and a satellite coupled to the gateway and the at least one user terminal. The satellite may include at least one directional antenna and a pathway coupled to the at least one directional antenna. The pathway may be associated with a hub-spoke spot beam group comprising at least one fixed location spot beam illuminating a location containing the gateway terminal and at least one other fixed location spot beam illuminating a location containing the at least one user terminal. The satellite may also include at least one receive-side switch coupled to an input of the pathway. The at least one receive-side switch may be configured to perform sequential switching to connect the input of the pathway with different spot beams within the hub-spoke spot beam group according to a receive beam switching pattern. The satellite may also include at least one transmit-side switch coupled to an output of the pathway. The at least one transmit-side switch may be configured to perform sequential switching to connect the output of the pathway with different spot beams within the hub-spoke spot beam group according to a transmit beam switching pattern. The receive beam switching pattern and transmit beam switching pattern may be synchronized over a frame to establish both forward traffic and return traffic over the pathway during the frame. The forward traffic may be sent from the gateway to the at least one user terminal, and the return traffic may be sent from the at least one user terminal to the gateway. A first fraction of time in the frame may be used to support forward traffic, and a second fraction of time in the frame may be used to support return traffic. The first and second fractions may be selected based on a desired ratio between forward and return capacity.

In an embodiment, the satellite may further include one or more LNAs each connecting an input of the at least one receive-side switch with a different spot beam within the hub-spoke spot beam group.

In another embodiment, the at least one receive-side switch may be implemented as a plurality of on-off controllable LNAs. The on-off controllable LNAs may have inputs connecting with different spot beams within the hub-spoke spot beam group and outputs combined with at least one combiner. The at least one combiner may have an output connecting with the input of the pathway.

In accordance with another embodiment of the invention, a communications satellite includes at least one directional antenna and a pathway coupled to the at least one directional antenna. The pathway may be associated with a hub-spoke spot beam group comprising at least one fixed location spot beam illuminating a location containing a gateway terminal and at least one other fixed location spot beam illuminating a location containing at least one user terminal. The communications satellite may also include at least one receive-side switch coupled to an input of the pathway. The at least one receive-side switch may be configured to perform sequential switching to connect the input of the pathway with different spot beams within the hub-spoke spot beam group according to a receive beam switching pattern. The communications satellite may also include at least one transmit-side switch coupled to an output of the pathway. The at least one transmit-side switch may be configured to perform sequential switching to connect the output of the pathway with different spot beams within the hub-spoke spot beam group according to a transmit beam switching pattern. The receive beam switching pattern and transmit beam switching pattern may be synchronized over a frame to establish both forward traffic and return traffic over the pathway during the frame. The forward traffic may be sent from the gateway to the at least one user terminal, and the return traffic may be sent from the at least one user terminal to the gateway. A first fraction of time in the frame may be used to support forward traffic, and a second fraction of time in the frame may be used to support return traffic. The first and second fractions may be selected based on a desired ratio between forward and return capacity.

In accordance with yet another embodiment of the invention, a communications satellite may include a hub-spoke spot beam group using at least one directional antenna on the satellite. The hub-spoke spot beam group may include at least one fixed location spot beam illuminating a location containing a gateway terminal and at least one other fixed location spot beam illuminating a location containing at least one user terminal. The satellite may include a pathway associated with the hub-spoke spot beam group. The communications satellite may also include a means for connecting an input of the pathway with different spot beams within the hub-spoke spot beam group according to a receive beam switching pattern, and a means for connecting an output of the pathway with different spot beams within the hub-spoke spot beam group according to a transmit beam switching pattern. The receive beam switching pattern and transmit beam switching pattern may be synchronized over a frame to establish both forward traffic and return traffic over the pathway during the frame. The forward traffic may be sent from the gateway to the at least one user terminal, and the return traffic may be sent from the at least one user terminal to the gateway. A first fraction of time in the frame may be used to support forward traffic, and a second fraction of time in the frame may be used to support return traffic. The first and second fractions may be selected based on a desired ratio between forward and return capacity.

BRIEF DESCRIPTION OF THE DRAWINGS

In some of the drawings a sub-label is associated with a reference numeral and follows a hyphen to denote one of multiple similar components. When reference is made to a reference numeral without specifying an existing sub-label, it is intended to refer to all such similar components.

FIGS. 4A-4G are simplified diagrams providing examples of flexible allocation of capacity in accordance with an embodiment of the present invention;

DETAILED DESCRIPTION

Figure 1:
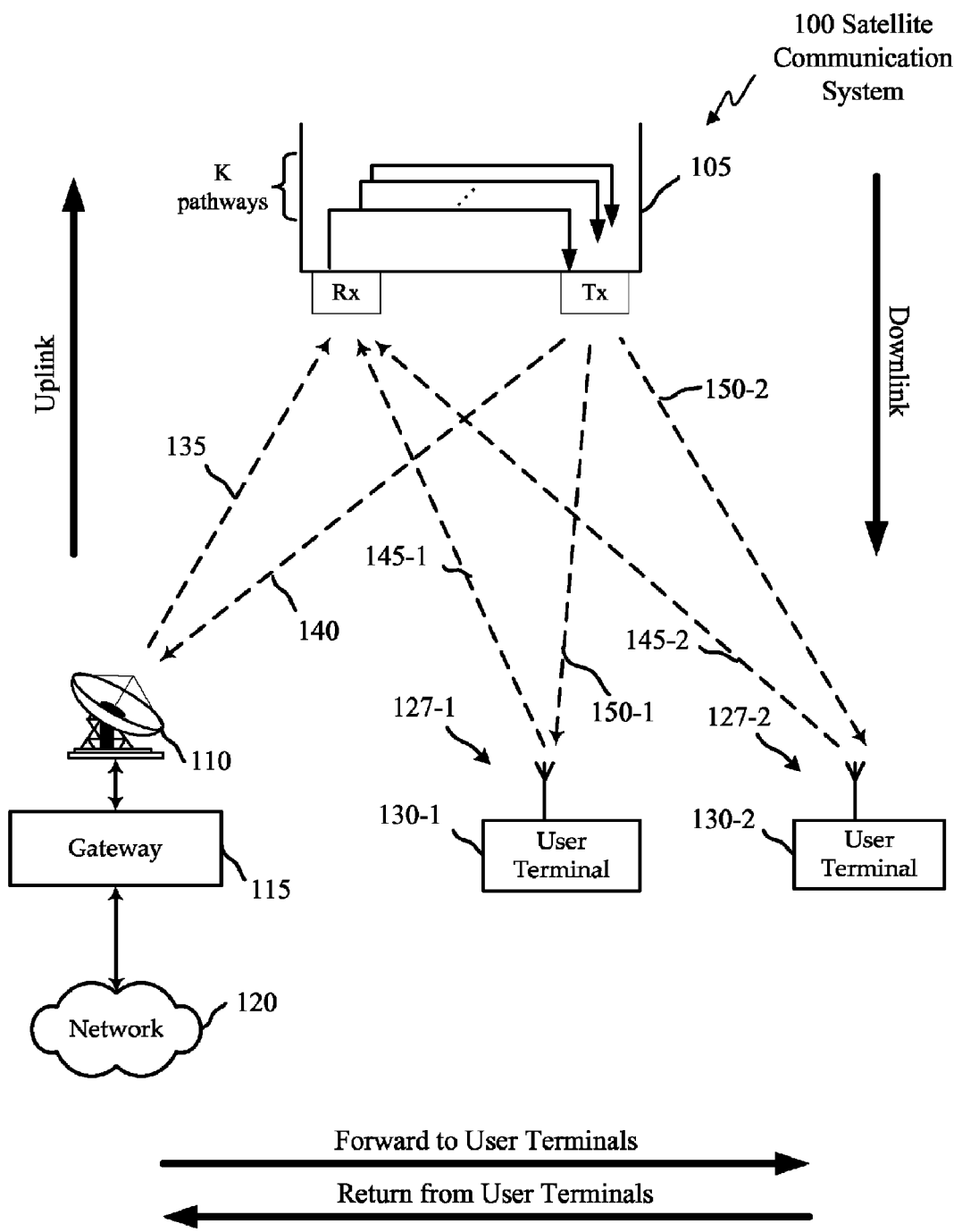
FIG. 1 is a simplified diagram of a hub-spoke satellite communication system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components may be included between the specified components.

FIG. 1 is a simplified diagram of a hub-spoke satellite communication system 100 in accordance with an embodiment of the present invention. The satellite communication system 100 includes a satellite 105 linking a gateway terminal 115 with one or more user terminals 130. The satellite communication system 100 may use a number of network architectures consisting of space and ground segments. The space segment may include more than one satellite while the ground segment may include a large number of user terminals, gateway terminals, network operations centers (NOCs), satellite and gateway terminal command centers, and the like. These elements are not shown in the figure for clarity.

The gateway terminal 115 is sometimes referred to as a hub or ground station. The gateway terminal 115 may service communication links 135, 140 between the gateway terminal 115 and the satellite 105. The gateway terminal 115 may also schedule traffic to the user terminals 130. Alternatively, the scheduling may be performed in other parts of the satellite communication system 100 (e.g., at one or more NOCs and/or gateway command centers neither of which are shown in this embodiment).

The gateway terminal 115 may also provide an interface between a network 120 and the satellite 105. The gateway terminal 115 may receive data and information from the network 120 that is directed the user terminals 130. The gateway terminal 115 may format the data and information for delivery to the user terminals 130 via the satellite 105. The gateway terminal 115 may also receive signals carrying data and information from the satellite 105. This data and information may be from the user terminals 130 and directed to destinations accessible via the network 120. The gateway terminal 115 may format this data and information for delivery via the network 120.

The network 120 may be any type of network and may include, for example, the Internet, an IP network, an intranet, a wide-area network (WAN), a local-area network (LAN), a virtual private network (VPN), a public switched telephone network (PSTN), a public land mobile network, and the like. The network 120 may include both wired and wireless connections as well as optical links. The network 120 may connect the gateway terminal 115 with other gateway terminals that may be in communication with the satellite 105 or with other satellites.

The gateway terminal 115 may use one or more antennas 110 to transmit forward uplink signals 135 to the satellite 105 and to receive return downlink signals 140 from the satellite 105. The antenna 110 shown in FIG. 1 includes a reflector with high directivity in the direction of the satellite 105 and low directivity in other directions. The antenna 110 may be implemented in a variety of alternative configurations and include operating features such as high isolation between orthogonal polarizations, high efficiency in the operational frequency bands, low noise, and the like.

In some satellite communication systems there may be a limited frequency spectrum available for transmission. Communication links 135, 140 between the gateway terminal 115 and the satellite 105 may use the same, overlapping, or different frequencies compared to the communication links 145, 150 between the satellite 105 and the user terminals 130. In some embodiments, the gateway terminal 115 may be located away from the user terminals 130, which enables frequency re-use. In other embodiments, the user terminals 130 may be located near the gateway terminal 115.

The satellite 105 may be a geostationary satellite that is configured to receive and transmit signals. The satellite 105 may receive the forward uplink signals 135 from the gateway terminal 115 and transmit corresponding forward downlink signals 150 to the user terminals 130. The satellite 105 may also receive return uplink signals 145 from the user terminals 130 and transmit corresponding return downlink signals 140 to the gateway terminal 115.

The satellite 105 may include one or more fixed directional antennas for reception and transmission of the signals 135, 140, 145, 150. A directional antenna may include a fixed reflector with one or more feed horns for each spot beam. The feed horns may be employed for receiving uplink signals 135, 145 and transmitting downlink signals 140, 150. The fixed feed of a directional antenna is in contrast to a more complex phased-array antenna that includes a number of phase combiners connected to a number of antenna elements.

Contours of a spot beam may be determined in part by the particular antenna design and depend on factors such as location of feed horn relative to a reflector, size of the reflector, type of feed horn, etc. Each spot beam may generally have a conical shape (typically circular or elliptical) that extends between the antenna and earth, illuminating a spot beam coverage area for both transmit and receive operations. A spot beam coverage area generally corresponds to an intersection between a spot beam and the earth's surface and may illuminate terminals that are not on the earth surface such as airborne user terminals, etc. In some embodiments, directional antennas may be used to form fixed location spot beams (or spot beams that are associated with substantially the same spot beam coverage area over time). This is in contrast to dynamic phased-array antennas that may be used to almost instantly change spot beam locations and their associated spot beam coverage areas. The directional antenna may be repointed, typically by mechanical means, but not fast enough to allow capacity flexibility as discussed herein.

The satellite 105 may operate in a multiple spot-beam mode, receiving and transmitting a number of signals in different spot beams. In the embodiment shown in FIG. 1, the gateway 115 and the user terminals 130 may be within the same or different spot beams. Each spot beam may use a single carrier (i.e., one carrier frequency), a contiguous frequency range, or a number of frequency ranges.

The satellite 105 may include a number of non-regenerative pathways (represented as K pathways in this embodiment). Each of the K pathways may be allocated as a forward pathway or a return pathway at any given instant in time. The uplink signals 135, 145 received by the satellite 105 may be directed along one or more of the pathways before being transmitted as downlink signals 140, 150.

The signals are not demodulated and re-modulated as in a regenerative or processing satellite architecture. Instead, signal manipulation by a non-regenerative satellite is generally limited to functions such as frequency translation, polarization conversion, filtering, amplification, and the like.

The forward downlink signals 150 may be transmitted from the satellite 105 to one or more of the user terminals 130. The user terminals 130 may receive the forward downlink signals 150 using antennas 127. In one embodiment, an antenna and a user terminal together include a very small aperture terminal (VSAT) with the antenna measuring approximately 0.75 meters in diameter and having approximately 2 watts of power. In other embodiments, a variety of other types of antennas 127 may be used to receive the forward downlink signals 150 from the satellite 105. Each of the user terminals 130 may include a single user terminal or a hub or router coupled to other user terminals. Each of the user terminals 130 may be connected to various consumer premises equipment (CPE) such as computers, local area networks, internet appliances, wireless networks, and the like.

The user terminals 130 may transmit data and information to a destination accessible via the network 120. The user terminals 130 may transmit the return uplink signals 145 to the satellite 105 using the antennas 127. The user terminals 130 may transmit the signals according to a variety of physical layer transmission, modulation and coding. In various embodiments, the physical layer techniques may be the same or different for each of the links 135, 140, 145, 150.

Figure 2:
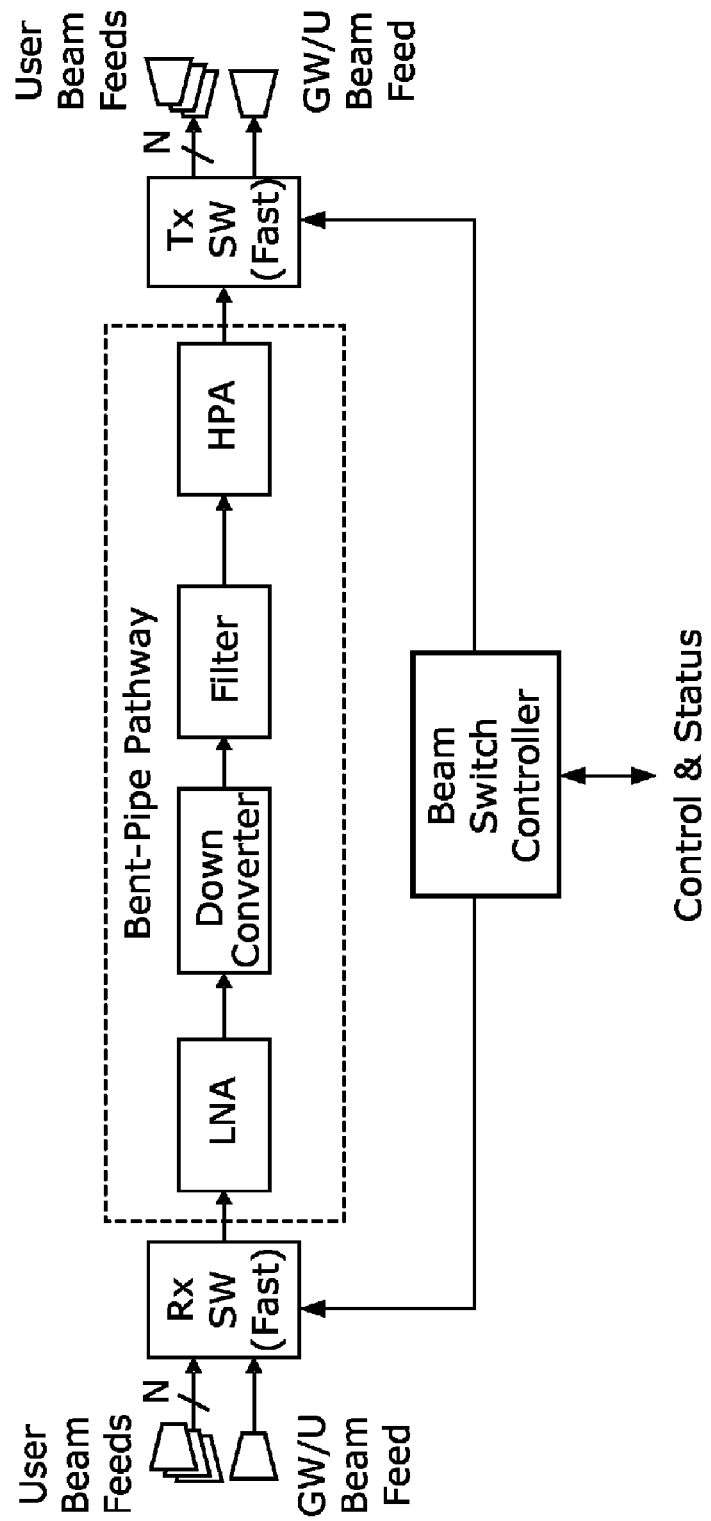
FIG. 2 is a simplified block diagram of a pathway coupled to a receive-side switch and a transmit-side switch in accordance with an embodiment of the present invention.

FIG. 2 is a simplified block diagram of a pathway coupled to a receive-side switch (Rx SW) and a transmit-side switch (Tx SW) in accordance with an embodiment of the present invention. This pathway may correspond to one of the K pathways shown in FIG. 1. In general, the pathway may provide for conversion of uplink signals received by the satellite into downlink signals. The pathway may include one or more of the components shown within the dotted box in FIG. 2. These components include an LNA, a down converter, a filter, and an HPA. In some embodiments, the pathway may simply include a receiver and a transmitter. The receiver may include only an LNA but may alternatively include frequency conversion (e.g., a down converter), filtering, and the like. The transmitter may include only an HPA but may also include frequency conversion (e.g., a down converter), filtering, and the like. In some embodiments, the components that are included within the pathway may be arranged in a different configuration than that shown in this embodiment. The specific components included in a pathway and the configuration of those components may depend on the particular application.

The receive-side switch may be used to control an input to the pathway. The receive-side switch may be before a receiver of the pathway along the signal path. The receive-side switch may switch a number of beam feeds into the receiver. In this embodiment, the receive-side switch may dynamically switch between one of N user beam feeds or a gateway beam feed. Each of the N user beam feeds may include signals from one or more user terminals (e.g., user terminals 130 of FIG. 1). The gateway beam feed may include signals from one or more gateway terminals (e.g., gateway terminal 115 of FIG. 1). In some embodiments, the gateway beam feed may sometimes include signals from user terminals that are located within the same spot beam coverage area as the gateway terminal (hence the designation "GW/U"). The set of beams that share a pathway are called a hub-spoke spot beam group. Although only a single gateway is shown in a hub-spoke spot beam group, in some embodiments, more than one gateway may be used.

In a similar manner, the transmit-side switch may be used to control an output from the pathway. The transmit-side switch may be after a transmitter of the pathway along the signal path. The transmit-side switch may switch a common signal between a number of output beam feeds. The transmit-side switch may dynamically switch between one of the N user beam feeds or the gateway beam feed.

As indicated in FIG. 2, the receive-side switch and the transmit-side switch may be fast switches (capable of switching rapidly, e.g., relative to a frame described further below) that are controlled by a beam switch controller. The switches may operate at radio frequency (RF) such as Ka band frequencies. In some embodiments, ferrite switches may be used. Ferrite switches may provide fast switching, low insertion loss (e.g., do not adversely impact equivalent isotropically radiated power (EIRP) or gain-to-noise-temperature (G/T)), and high power handling capabilities. A single LNA is shown as part of the pathway. In alternate embodiments, LNAs may be before the Rx switch. For example, each receive feed in a hub-spoke spot beam group may have an LNA. The switch may appear after the LNAs, or in one alternative, a summer may combine the LNA outputs and the LNAs themselves may be switched on and off to implement the switching function.

Forward link operation may be obtained by connecting the receive-side switch to the gateway beam feed and cycling the transmit-side switch through the output switch positions. Return link operation may be obtained by connecting the transmit-side switch to the gateway beam feed and cycling the receive-side switch through the input switch positions. Receive beam switching patterns and transmit beam switching patterns may be used to determine the input and output switch positions at specific times.

The fraction of time spent in each position may determine the capacity provided to each beam. The capacity may be changed by changing the fraction of time spent in each position. This provides flexibility in allocating capacity between different beams both temporally and spatially (e.g., temporally by changing capacity allocation for a particular beam over time and spatially by changing capacity allocation for a particular spot beam coverage area over time).

Similarly, the fraction of time spent in the forward link configuration may determine the capacity provided to the forward direction, and the time spent in the return link configuration may determine the capacity provided to the return direction. The capacity ratio may be changed by changing the fraction of time spent in each configuration. This provides flexibility in allocating capacity between forward and return traffic.

Using the receive-side switch and the transmit-side switch, the receive beam feeds (and their associated spot beams) may be connected to the transmit beam feeds (and their associated spot beams). Since there is only one pathway, only one of the receive beam feeds may be connected to one of the transmit beam feeds at a given instant in time. There will generally be more beam feeds (and hence more spot beams) than pathways. A beam switching controller may provide receive beam switching patterns (e.g., a receive switching sequence) to the receive-side switch and transmit beam switching patterns (e.g., a transmit switching sequence) to the transmit-side switch. The switching pattern may be a set of switch positions versus time during a frame. A frame may be a time during which all active beams may be sequentially served (note that each beam is not necessarily active in each frame). A frame may be further segmented into a number of sequential slots that define periods during which switch positions are unchanging. After each slot the instantaneous beam positions may change or remain the same for the next slot. The switching speed of the receive-side switch and the transmit-side switch may be small relative to the slot duration (e.g., less than 25% of a slot time).

The transmit and receive switching patterns may be synchronized in time to provide sequential beam switching over the pathway during a frame. The switching patterns may be stored in memory at the beam switch controller and may be uploaded using an uplink signal that may be either in-band or out-of-band with other uplink signals. In some embodiments, the switching patterns may be the same from frame-to-frame (repeated in each of a plurality of consecutive frames), while in other embodiments the switching patterns may be changed from frame-to-frame. In yet other embodiments, a particular switching pattern may be used for a particular time duration while another switching pattern may be used for a different time duration (e.g., different times of the day, different days of the week, or the like). Many variations, modifications, and alternative switching patterns may be used within the embodiments disclosed herein. Whether the switching patterns remain the same or changes may depend on a desired capacity allocation or a desired ratio between forward and return capacity.

Figure 3:
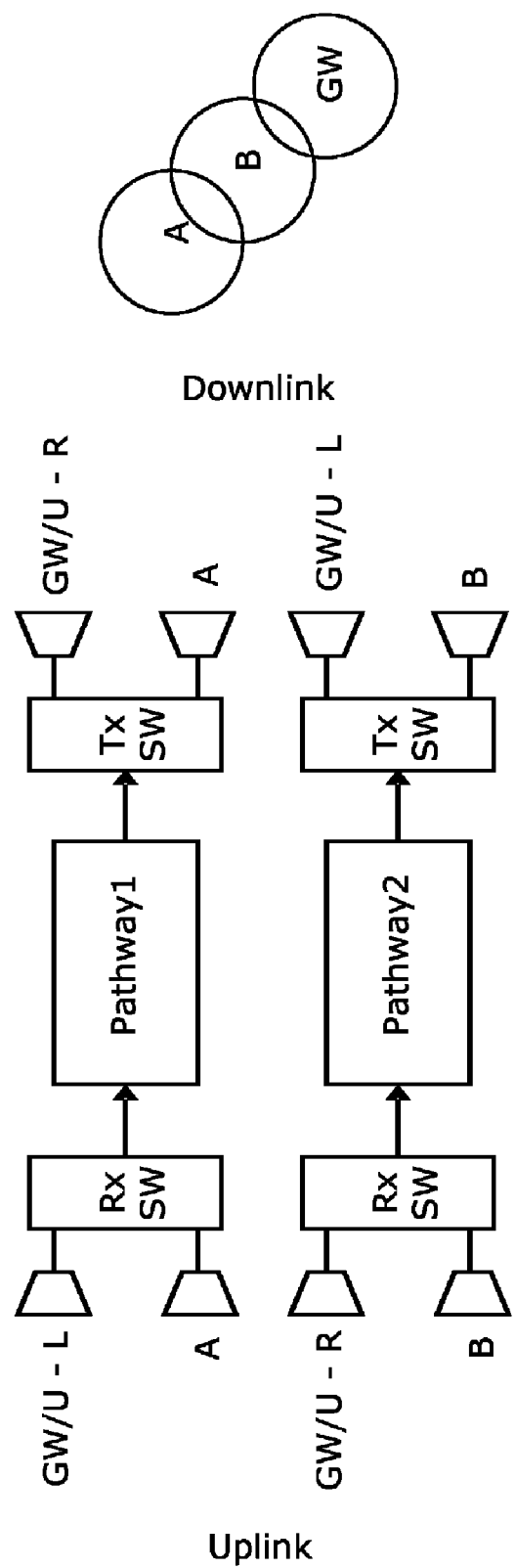
FIG. 3 is a simplified block diagram of two pathways each coupled to a receive-side switch and a transmit-side switch to provide beam switching in accordance with an embodiment of the present invention.

FIG. 3 is a simplified block diagram of two pathways each coupled to a receive-side switch and a transmit-side switch to provide beam switching in accordance with an embodiment of the present invention. These pathways may correspond to two of the K pathways shown in FIG. 1. Although not explicitly shown, each of the pathways may include one or more of the same components as the pathway shown in FIG. 2. The gateway beam feed may be associated with a gateway terminal and user terminals in some embodiments. As in the embodiment of FIG. 2, a beam switching controller (not shown) may be employed. To the side of the satellite hardware is an example map showing beam coverage areas A, B and GW/U.

In this embodiment, the first pathway (Pathway 1) is coupled to a receive-side switch and a transmit-side switch that are each associated with a user beam feed (A). The second pathway (Pathway 2) is coupled to a receive-side switch and a transmit-side switch that are each associated with a user beam feed (B). The switches may be fast switches as described previously. The user terminals associated with each of the user beam feeds A, B may be serviced by the same gateway terminal associated with a gateway beam feed (GW/U).

To reduce interference, the gateway beam feeds GW/U at each pathway may use orthogonal polarizations and the uplink frequencies may be different from the downlink frequencies. The uplink gateway beam feed GW/U to Pathway 1 may use a left-hand polarization (L), and the uplink gateway beam feed GW/U to Pathway 2 may use a right-hand polarization (R). In this embodiment, the pathways convert the polarization so that the downlink gateway beam feed GW/U from Pathway 1 uses a right-hand polarization R, and the downlink gateway beam feed GW/U from Pathway 2 uses a left-hand polarization L. Due to the different polarizations and frequencies, the spot beam associated with the gateway beam feed GW/U may include both forward and return signals simultaneously.

In some embodiments, there may be two groups of user terminals associated with the gateway beam feed GW/U. One group may transmit using a left-hand polarization L and receive using a right-hand polarization R. These user terminals may be serviced through Pathway 1. Another group may transmit using a right-hand polarization R and receive using a left-hand polarization L. These user terminals may be serviced through Pathway 2.

The receive-side switch and the transmit-side switch coupled to Pathway 1 may use switching patterns that are independent of those used by the receive-side switch and the transmit-side switch coupled to Pathway 2. This provides flexibility in allocating capacity between each of the beam feeds (A, B, GW/U) both temporally and spatially as well as between both forward and return traffic.

FIGS. 4A-4G are simplified diagrams providing examples of flexible allocation of capacity in accordance with an embodiment of the present invention. The satellite communication system may use a framed hub-spoke beam switched pathway access protocol, with time slots like a Satellite Switched Time-Division Multiple Access (SS/TDMA) scheme. Now, however, each time slot of the frame may correspond to either forward link (gateway to user terminals) or return link (user terminals to gateway) traffic from a transmitting beam to a receiving beam—not just a single transmission from one terminal to another.

During normal operation, continuous streams of frames are typically used to facilitate the communications. In the embodiment presented in FIG. 4A, a single hub-spoke beam switched frame is shown that includes 64 time slots. FIGS. 4A-4G are presented merely as examples, and embodiments of the present invention are not limited to specific pathway access protocols or frame/slot configurations. Multiple terminals may be serviced during each time slot using multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like).

FIGS. 4B-4C provide examples of flexible allocation of capacity during a frame. These figures provide visual representations of the flexible allocation of capacity that may be realized using the beam switching patterns described throughout this specification. These examples refer specifically to the pathways (Pathway 1, Pathway 2) and the beams (A, B, GW/U) shown in FIG. 3.

FIG. 4B shows signals passing through Pathway 1 and Pathway 2 during a frame (Frame 1). The first 19 slots of Frame 1 over Pathway 1 are occupied by signals that are received at the gateway beam feed GW/U and transmitted to the gateway beam feed GW/U. These are forward link signals from the gateway terminal associated with the gateway beam feed GW/U that are destined for at least one user terminal associated with the gateway beam feed GW/U. During these 19 slots, the receive-side switch is in an input switch position associated with the gateway beam feed GW/U, and the transmit-side switch is in an output switch position associated with the gateway beam feed GW/U.

The next 14 slots of Frame 1 over Pathway 1 are occupied by signals that are received from the gateway beam feed GW/U and transmitted to the gateway beam feed GW/U. These are return link signals from at least one user terminal associated with the gateway beam feed GW/U that are destined for the gateway terminal associated with the gateway beam feed GW/U. During these 14 slots, the receive-side switch is in the input switch position associated with the gateway beam feed GW/U, and the transmit-side switch is in the output switch position associated with the gateway beam feed GW/U.

The next 12 slots of Frame 1 over Pathway 1 are occupied by signals that are received from the user beam feed A and transmitted to the gateway beam feed GW/U. These are return link signals from at least one user terminal associated with the user beam feed A that are destined for the gateway terminal associated with the gateway beam feed GW/U. During these 12 slots, the receive-side switch is in an input switch position associated with the user beam feed A, and the transmit-side switch is in the output switch position associated with the gateway beam feed GW/U.

The final 19 slots of Frame 1 over Pathway 1 are occupied by signals that are received from the gateway beam feed GW/U and transmitted to the user beam feed A. These are forward link signals from the gateway terminal associated with the gateway beam feed GW/U that are destined for at least one user terminal associated with the user beam feed A. During these 19 slots, the receive-side switch is in the input switch position associated with the gateway beam feed GW/U, and the transmit-side switch is in and output switch position associated with the user beam feed A.

Without going into the same level of detail as with Pathway 1, the first 12 slots of Frame 1 over Pathway 2 are occupied by forward link signals that are received from the gateway beam feed GW/U and transmitted to the user beam feed B. The next 15 slots of Frame 1 over Pathway 2 are occupied by forward link signals that are received from the gateway beam feed GW/U and transmitted to the gateway beam feed GW/U. The next 21 slots of Frame 1 over Pathway 2 are occupied by return link signals that are received from the user beam feed B and transmitted to the gateway beam feed GW/U. The final 16 slots of Frame 1 over Pathway 2 are occupied by return link signals that are received from the gateway beam feed GW/U and transmitted to the gateway beam feed GW/U. For each of these configurations, the receive-side switch and the transmit-side switch associated with Pathway 2 are switched to the appropriate input and output switch positions based on receive beam switching patterns and transmit beam switching patterns.

FIG. 4C shows signals passing through Pathway 1 and Pathway 2 during a different frame (Frame 2). This frame may be adjacent to Frame 1 in time or there may be any number of frames between Frame 1 and Frame 2. The first 12 slots of Frame 2 over Pathway 1 are occupied by return link signals that are received from the user beam feed A and transmitted to the gateway beam feed GW/U. The next 19 slots of Frame 2 over Pathway 1 are occupied by forward link signals that are received from the gateway beam feed GW/U and transmitted to the gateway beam feed GW/U. The next 19 slots of Frame 2 over Pathway 1 are occupied by forward link signals that are received from the gateway beam feed GW/U and transmitted to the user beam feed A. The final 16 slots of Frame 2 over Pathway 1 are occupied by return link signals that are received from the gateway beam feed GW/U and transmitted to the gateway beam feed GW/U.

The first 17 slots of Frame 2 over Pathway 2 are occupied by return link signals that are received from the user beam feed B and transmitted to the gateway beam feed GW/U. The next 17 slots of Frame 2 over Pathway 2 are occupied by forward link signals that are received from the gateway beam feed GW/U and transmitted to the gateway beam feed GW/U. The next 16 slots of Frame 2 over Pathway 2 are occupied by return link signals that are received from the gateway beam feed GW/U and transmitted to the gateway beam feed GW/U. The final 14 slots of Frame 2 over Pathway 2 are occupied by forward link signals that are received from the gateway beam feed GW/U and transmitted to the user beam feed B.

Figure 4D:
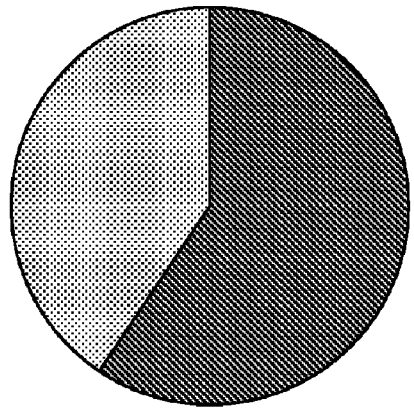
Figure 4D:
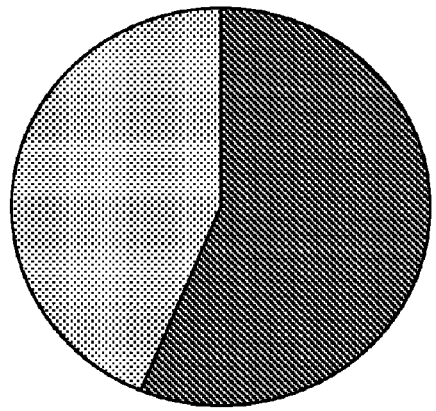
Figure 4E:
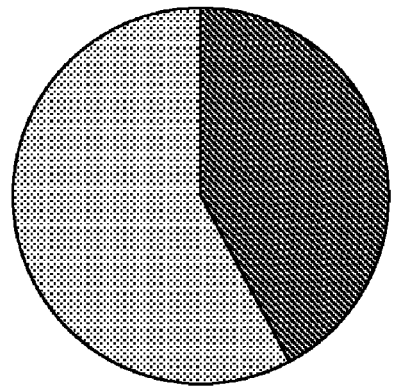
Figure 4E:
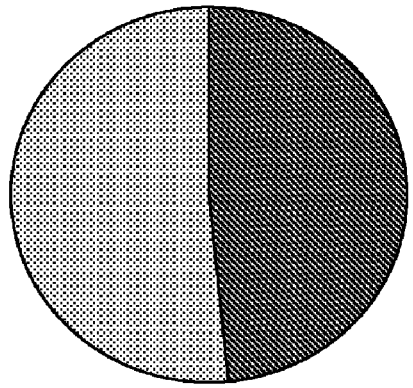

In comparing FIG. 4B with FIG. 4C, it can be seen that capacity (as indicated by the fraction of time spent in each position) is allocated differently between Frame 1 and Frame 2 for each of the different pathways. FIGS. 4D-4E use pie charts to show the change in allocation of forward and return traffic between Frame 1 and Frame 2. FIG. 4D shows that for Pathway 1 more slots are used for forward link signals during Frame 1 than during Frame 2. FIG. 4E shows that for Pathway 2 more slots are used for return link signals during Frame 1 than during Frame 2.

Figure 4F:
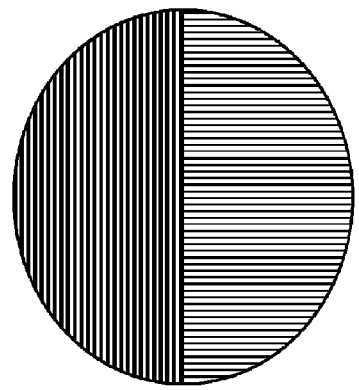
Figure 4F:
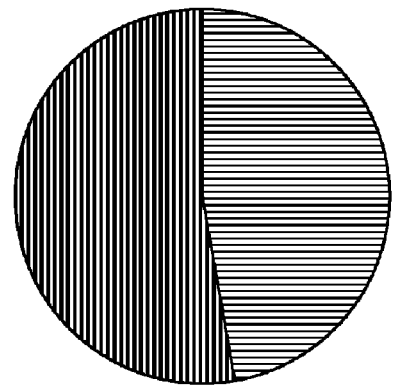
Figure 4G:
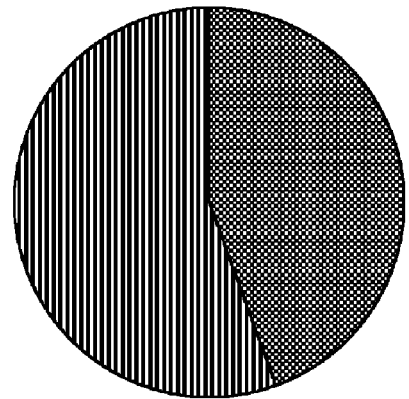
Figure 4G:
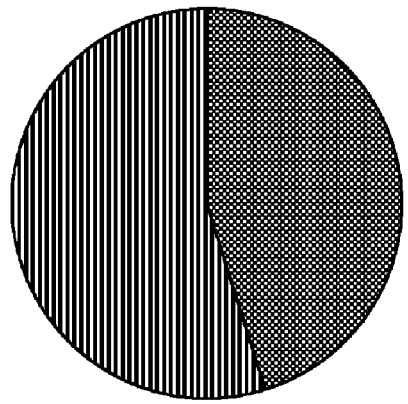

FIGS. 4F-4G use pie charts to show the change in allocation between forward link signals between Frame 1 and Frame 2 for the user beam feeds. FIG. 4F shows that for Pathway 1 more slots are used for forward link signals for the user beam feed A during Frame 1 than during Frame 2. FIG. 4G shows that for Pathway 2 more slots are used for forward link signals for the gateway beam feed GW/U during Frame 1 than during Frame 2.

These figures (particularly FIGS. 4D-4G) illustrate that the fraction of time spent in each switch position may be changed (e.g., from frame to frame, from time to time, or the like). This may be done using the switching patterns (receive beam switching patterns and transmit beam switching patterns) described previously. This allows capacity to be flexibly allocated between each of the beam feeds (feeds A, B, GW/U in this embodiment). Thus, capacity may be flexibly allocated both temporally and spatially as well as between both forward and return traffic.

Figure 5:
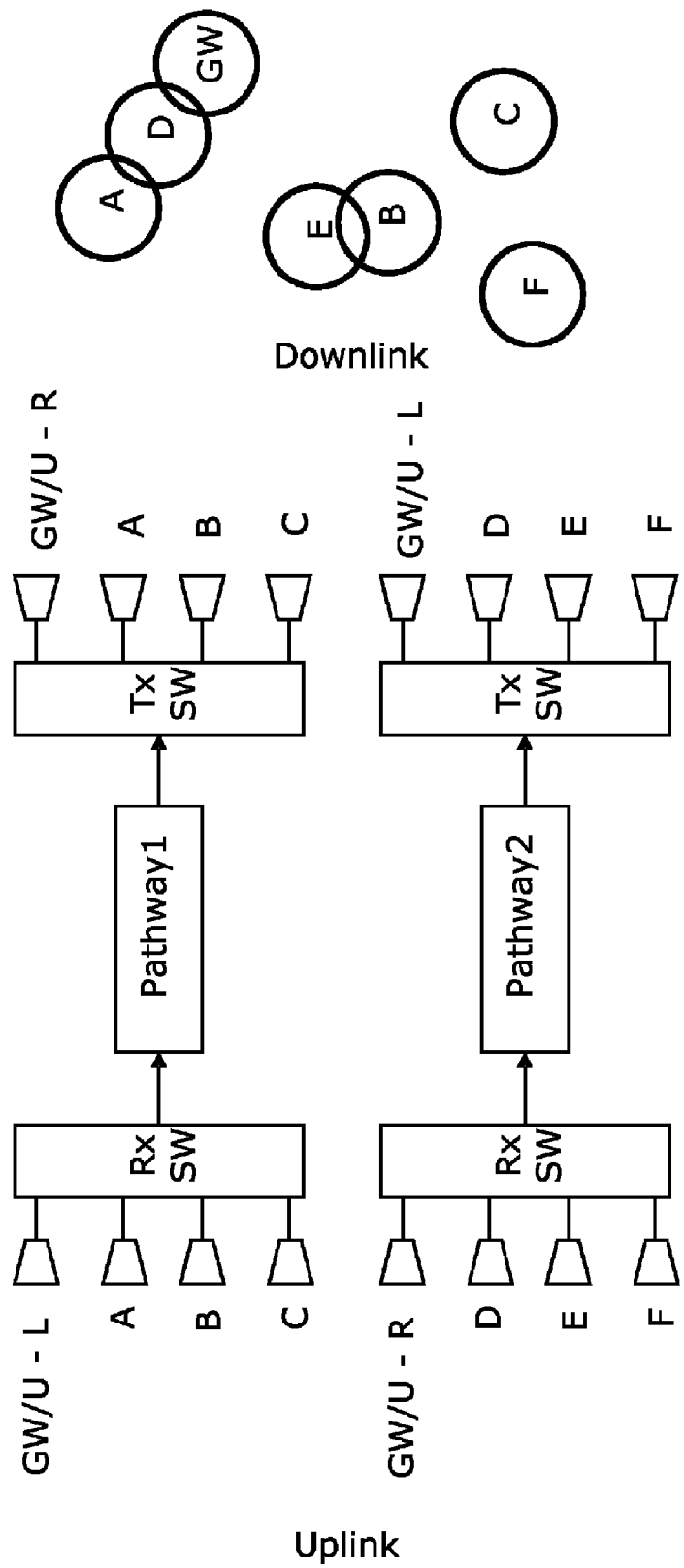
FIG. 5 is a simplified block diagram of pathways each coupled to a receive-side switch and a transmit-side switch to provide beam switching in accordance with another embodiment of the present invention.

FIG. 5 is a simplified block diagram of pathways each coupled to a receive-side switch and a transmit-side switch to provide beam switching in accordance with another embodiment of the present invention. These pathways may correspond to the K pathways shown in FIG. 1. Although not explicitly shown, each of the pathways may include one or more of the same components as the pathway shown in FIG. 2. The gateway beam feed may be associated with a gateway terminal and user terminals in some embodiments. As in the embodiment of FIG. 2, a beam switching controller (not shown) may be employed. To the side of the satellite hardware is an example map showing beam coverage areas A, B, C, D, E, F and GW/U.

In this embodiment, the first pathway (Pathway 1) is coupled to a receive-side switch and a transmit-side switch that are each associated with user beam feeds (A, B, C). The second pathway (Pathway 2) is coupled to a receive-side switch and a transmit-side switch that are each associated with user beam feeds (D, E, F). The switches may be fast switches as described previously. The user terminals associated with each of the user beam feeds A, B, C, D, E, F may be serviced by the same gateway terminal associated with a gateway beam feed (GW/U). In FIG. 3, the communication capacity from a single gateway is distributed by a pair of pathways to users in 3 user beams (A, B, GW/U). In FIG. 5, a similar pair of pathways are used to distribute the communication capacity from the gateway to 7 user beams (A, B, C, D, E, F, GW/U) thus expanding the coverage area without adding pathways or gateways. 4 additional feeds are used for each of the transmit and receive antennas. Each of the two receive switches handles 2 more inputs and each of the two transmit switches handles 2 more outputs as compared to the embodiment of FIG. 3.

Figure 6:
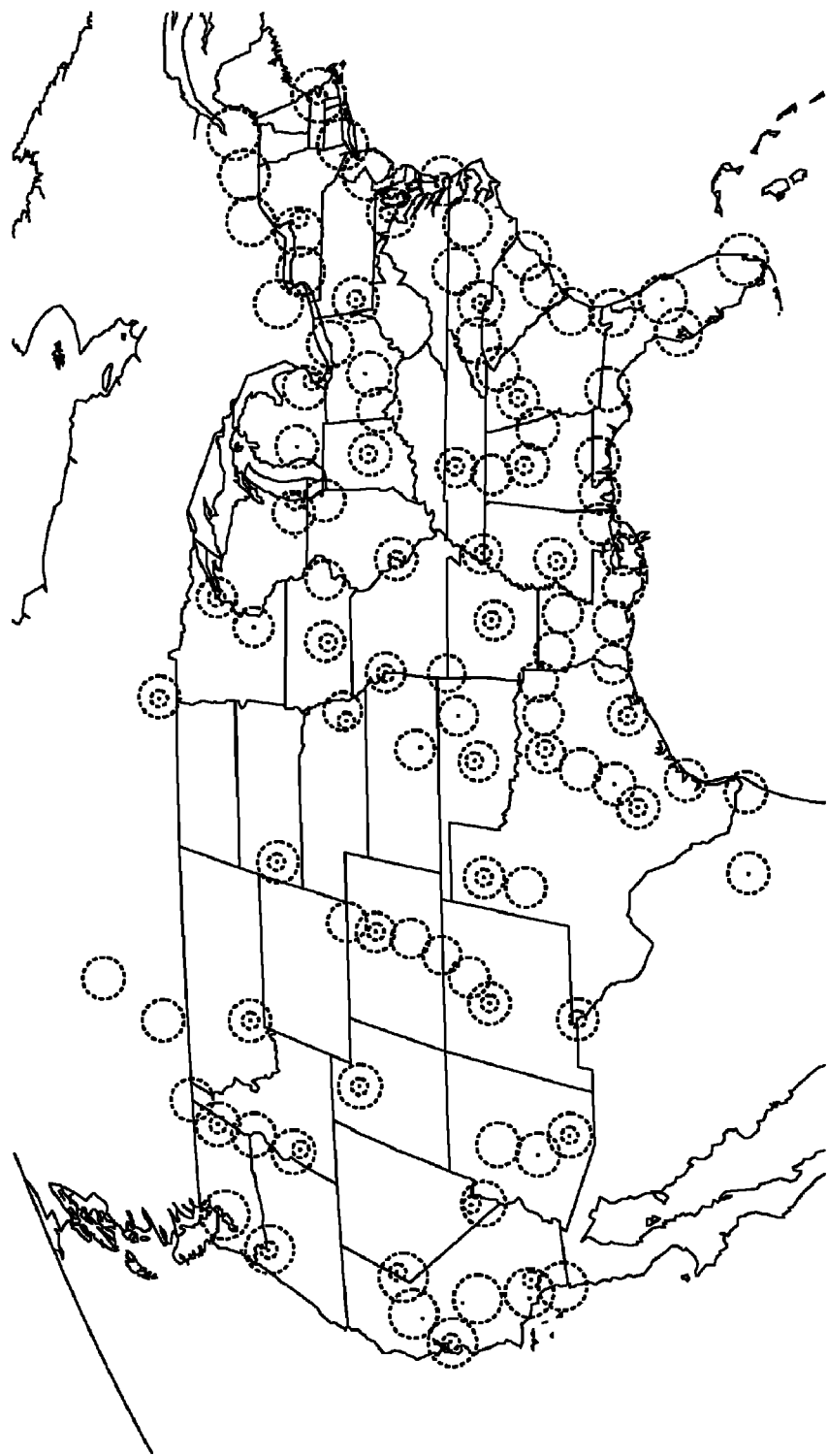
FIG. 6 is a simplified map of a portion of North America that provides an example of spot beam coverage areas in accordance with an embodiment of the present invention.

FIG. 6 is a simplified map of a portion of North America that provides an example of spot beam coverage areas in accordance with an embodiment of the present invention. The spot beam coverage areas may be the result of fixed location spot beams formed using one or more directional antennas on a satellite. Some of the fixed location spot beams illuminate locations that include gateway terminals (indicated by a smaller dotted circle inside a larger dotted circle). These locations may also include user terminals. Other fixed location spot beams illuminate locations that include only user terminals (indicated by larger dotted circles without smaller dotted circles). As described above, capacity may be flexibly allocated both temporally and spatially as well as between both forward and return traffic between the spot beam coverage areas shown on the map.

Embodiments of the present invention are not limited to the examples shown or described herein. For example, embodiments of the present invention may be used with any number of pathways, and receive-side switches and transmit-side switches may be associated with any suitable number of beam feeds, forming hub-spoke spot beam groups of various sizes. Different pathways on a satellite may be coupled to receive-side switches and transmit-side switches that are associated with the same or a different numbers of beam feeds.

Furthermore, features of one or more embodiments may be combined with features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for conducting communications via a satellite comprising:
   providing a hub-spoke spot beam group using at least one directional antenna on the satellite, the hub-spoke spot beam group comprising at least one fixed location spot beam illuminating a location containing a gateway terminal and at least one other fixed location spot beam illuminating a location containing at least one user terminal;
   wherein the satellite comprises a pathway associated with the hub-spoke spot beam group;
   sequentially switching at least one receive-side switch to connect an input of the pathway with different spot beams within the hub-spoke spot beam group, according to a receive beam switching pattern;
   sequentially switching at least one transmit-side switch to connect an output of the pathway with different spot beams within the hub-spoke spot beam group, according to a transmit beam switching pattern;
   wherein the receive beam switching pattern and the transmit beam switching pattern are synchronized over a frame to establish both forward traffic and return traffic over the pathway during the frame, the forward traffic being sent from the gateway to the at least one user terminal, the return traffic being sent from the at least one user terminal to the gateway; and
   wherein a first fraction of time in the frame is used to support forward traffic and a second fraction of time in the frame is used to support return traffic, wherein the first and second fractions are selected based on a desired ratio between forward and return capacity.

2. The method of claim 1 wherein the receive beam switching pattern and transmit beam switching pattern are repeated in each of a plurality of consecutive frames.

3. The method of claim 1 wherein the location illuminated by the at least one fixed location spot beam and containing the gateway terminal also contains at least one user terminal.

4. The method of claim 1 wherein the satellite comprises a plurality of pathways, each associated with a corresponding hub-spoke spot beam group, wherein for each pathway and corresponding hub-spoke spot beam group:
   at least one receive-side switch is sequentially switched according to a receive beam switching pattern, and at least one transmit-side switch is sequentially switched according to a transmit beam switching pattern, to establish both forward traffic and return traffic over the pathway during the frame, and
   a first fraction of time in the frame is used to support forward traffic and a second fraction of time in the frame is used to support return traffic, wherein the first and second fractions are selected based on a desired ratio between forward and return capacity.

5. The method of claim 1 wherein the pathway associated with the hub-spoke spot beam group comprises a receiver and a transmitter.

6. The method of claim 5 wherein the receiver comprises a low noise amplifier (LNA).

7. The method of claim 5 wherein the transmitter comprises a high power amplifier (HPA).

8. A satellite communication system comprising:
   a gateway;
   at least one user terminal;
   a satellite coupled to the gateway and the at least one user terminal;
   wherein the satellite comprises:
      at least one directional antenna and a pathway coupled to the at least one directional antenna, the pathway associated with a hub-spoke spot beam group comprising at least one fixed location spot beam illuminating a location containing the gateway terminal and at least one other fixed location spot beam illuminating a location containing the at least one user terminal;
      at least one receive-side switch coupled to an input of the pathway, the at least one receive-side switch configured to perform sequential switching to connect the input of the pathway with different spot beams within the hub-spoke spot beam group, according to a receive beam switching pattern;
      at least one transmit-side switch coupled to an output of the pathway, the at least one transmit-side switch configured to perform sequential switching to connect the output of the pathway with different spot beams within the hub-spoke spot beam group, according to a transmit beam switching pattern;
      wherein the receive beam switching pattern and transmit beam switching pattern are synchronized over a frame to establish both forward traffic and return traffic over the pathway during the frame, the forward traffic being sent from the gateway to the at least one user terminal, the return traffic being sent from the at least one user terminal to the gateway; and
      wherein a first fraction of time in the frame is used to support forward traffic and a second fraction of time in the frame is used to support return traffic, wherein the first and second fractions are selected based on a desired ratio between forward and return capacity.

9. The satellite communication system of claim 8 wherein the receive beam switching pattern and transmit beam switching pattern are repeated in each of a plurality of consecutive frames.

10. The satellite communication system of claim 8 wherein the location illuminated by the at least one fixed location spot beam and containing the gateway terminal also contains at least one user terminal.

11. The satellite communication system of claim 8 wherein the satellite comprises a plurality of pathways, each associated with a corresponding hub-spoke spot beam group, wherein for each pathway and corresponding hub-spoke spot beam group:
   at least one receive-side switch is sequentially switched according to a receive beam switching pattern, and at least one transmit-side switch is sequentially according to a transmit beam switching pattern, to establish both forward traffic and return traffic over the pathway during the frame, and a first fraction of time in the frame is used to support forward traffic and a second fraction of time in the frame is used to support return traffic, wherein the first and second fractions are selected based on a desired ratio between forward and return capacity.

12. The satellite communication system of claim 8 wherein the satellite further comprises one or more low noise amplifiers (LNAs) each connecting an input of the at least one receive-side switch with a different spot beam within the hub-spoke spot beam group.

13. The satellite communication system of claim 8 wherein the at least one receive-side switch is implemented as a plurality of on-off controllable low noise amplifiers (LNAs), the on-off controllable LNAs having inputs connecting with different spot beams within the hub-spoke spot beam group and outputs combined with at least one combiner, the at least one combiner having an output connecting with the input of the pathway.

14. The satellite communication system of claim 8 wherein the pathway associated with the hub-spoke spot beam group comprises a receiver and a transmitter.

15. The satellite communication system of claim 14 wherein the receiver comprises a low noise amplifier (LNA).

16. The satellite communication system of claim 14 wherein the transmitter comprises a high power amplifier (HPA).

17. A communications satellite comprising:
at least one directional antenna;
a pathway coupled to the at least one directional antenna, the pathway associated with a hub-spoke spot beam group comprising at least one fixed location spot beam illuminating a location containing a gateway terminal and at least one other fixed location spot beam illuminating a location containing at least one user terminal;
at least one receive-side switch coupled to an input of the pathway, the at least one receive-side switch configured to perform sequential switching to connect the input of the pathway with different spot beams within the hub-spoke spot beam group, according to a receive beam switching pattern;
at least one transmit-side switch coupled to an output of the pathway, the at least one transmit-side switch configured to perform sequential switching to connect the output of the pathway with different spot beams within the hub-spoke spot beam group, according to a transmit beam switching pattern;
wherein the receive beam switching pattern and transmit beam switching pattern are synchronized over a frame to establish both forward traffic and return traffic over the pathway during the frame, the forward traffic being sent from the gateway to the at least one user terminal, the return traffic being sent from the at least one user terminal to the gateway; and
wherein a first fraction of time in the frame is used to support forward traffic and a second fraction of time in the frame is used to support return traffic, wherein the first and second fractions are selected based on a desired ratio between forward and return capacity.

18. The communications satellite of claim 17 wherein the receive beam switching pattern and transmit beam switching pattern are repeated in each of a plurality of consecutive frames.

19. The communications satellite of claim 17 wherein the satellite comprises a plurality of pathways, each associated with a corresponding hub-spoke spot beam group, wherein for each pathway and corresponding hub-spoke spot beam group:
at least one receive-side switch is sequentially switched according to a receive beam switching pattern, and at least one transmit-side switch is sequentially according to a transmit beam switching pattern, to establish both forward traffic and return traffic over the pathway during the frame, and
a first fraction of time in the frame is used to support forward traffic and a second fraction of time in the frame is used to support return traffic, wherein the first and second fractions are selected based on a desired ratio between forward and return capacity.

20. The communications satellite of claim 17 further comprising one or more low noise amplifiers (LNAs) each connecting an input of the at least one receive-side switch with a different spot beam within the hub-spoke spot beam group.

21. The communications satellite of claim 17 wherein the at least one receive-side switch is implemented as a plurality of on-off controllable low noise amplifiers (LNAs), the on-off controllable LNAs having inputs connecting with different spot beams within the hub-spoke spot beam group and outputs combined with at least one combiner, the at least one combiner having an output connecting with the input of the pathway.

22. The communications satellite of claim 17 wherein the pathway associated with the hub-spoke spot beam group comprises a receiver and a transmitter.

23. The communications satellite of claim 22 wherein the receiver comprises a low noise amplifier (LNA).

24. The communications satellite of claim 22 wherein the transmitter comprises a high power amplifier (HPA).

25. A communications satellite comprising:
a hub-spoke spot beam group using at least one directional antenna on the satellite, the hub-spoke spot beam group comprising at least one fixed location spot beam illuminating a location containing a gateway terminal and at least one other fixed location spot beam illuminating a location containing at least one user terminal;
wherein the satellite comprises a pathway associated with the hub-spoke spot beam group;
means for connecting an input of the pathway with different spot beams within the hub-spoke spot beam group, according to a receive beam switching pattern;
means for connecting an output of the pathway with different spot beams within the hub-spoke spot beam group, according to a transmit beam switching pattern;
wherein the receive beam switching pattern and transmit beam switching pattern are synchronized over a frame to establish both forward traffic and return traffic over the pathway during the frame, the forward traffic being sent from the gateway to the at least one user terminal, the return traffic being sent from the at least one user terminal to the gateway; and
wherein a first fraction of time in the frame is used to support forward traffic and a second fraction of time in the frame is used to support return traffic, wherein the first and second fractions are selected based on a desired ratio between forward and return capacity.

26. The communications satellite of claim 25 wherein the receive beam switching pattern and transmit beam switching pattern are repeated in each of a plurality of consecutive frames.

27. The communications satellite of claim 25 wherein the satellite comprises a plurality of pathways, each associated with a corresponding hub-spoke spot beam group, wherein for each pathway and corresponding hub-spoke spot beam group:
- at least one receive-side switch is sequentially switched according to a receive beam switching pattern, and at least one transmit-side switch is sequentially according to a transmit beam switching pattern, to establish both forward traffic and return traffic over the pathway during the frame, and
- a first fraction of time in the frame is used to support forward traffic and a second fraction of time in the frame is used to support return traffic, wherein the first and second fractions are selected based on a desired ratio between forward and return capacity.

28. The communications satellite of claim 25 wherein the pathway associated with the hub-spoke spot beam group comprises a receiver and a transmitter.

29. The communications satellite of claim 28 wherein the receiver comprises a low noise amplifier (LNA).

30. The communications satellite of claim 28 wherein the transmitter comprises a high power amplifier (HPA).

* * * * *